United States Patent [19]
Boige

[11] 3,928,320
[45] Dec. 23, 1975

[54] PROCESS FOR THE PREPARATION OF METHYLCOBALAMINE

[76] Inventor: Jean Boige, 53, rue Vercingetorix, Aulnay-sous-Bois, Seine-Saint-Denis, France

[22] Filed: July 26, 1974

[21] Appl. No.: 492,975

Related U.S. Application Data

[63] Continuation-in-part of Ser. No. 303,147, Nov. 2, 1972, abandoned.

[30] Foreign Application Priority Data

| | | |
|---|---|---|
| Nov. 10, 1971 | France | 71.40233 |
| Aug. 8, 1973 | France | 73.28998 |
| Dec. 28, 1973 | France | 73.46829 |

[52] U.S. Cl. .............................. 260/211.7; 424/201
[51] Int. Cl.² ......................................... C07H 23/00
[58] Field of Search ................................. 260/211.7

[56] References Cited
UNITED STATES PATENTS

| | | | |
|---|---|---|---|
| 3,459,735 | 8/1969 | Murakami et al. | 260/211.7 |

FOREIGN PATENTS OR APPLICATIONS

| | | | |
|---|---|---|---|
| 963,373 | 7/1964 | United Kingdom | 260/211.7 |

*Primary Examiner*—Johnnie R. Brown
*Assistant Examiner*—Cary Owens
*Attorney, Agent, or Firm*—Young & Thompson

[57] ABSTRACT

This invention relates to a process for the preparation of methylcobalamine by reduction and methylation of cyanocobalamine or hydroxocobalamine. The reduction and methylation are carried out simultaneously in an aqueous methanol solution of cyanocobalamine or hydroxocobalamine through the action of monomethyl oxalate in the presence of zinc.

12 Claims, 1 Drawing Figure

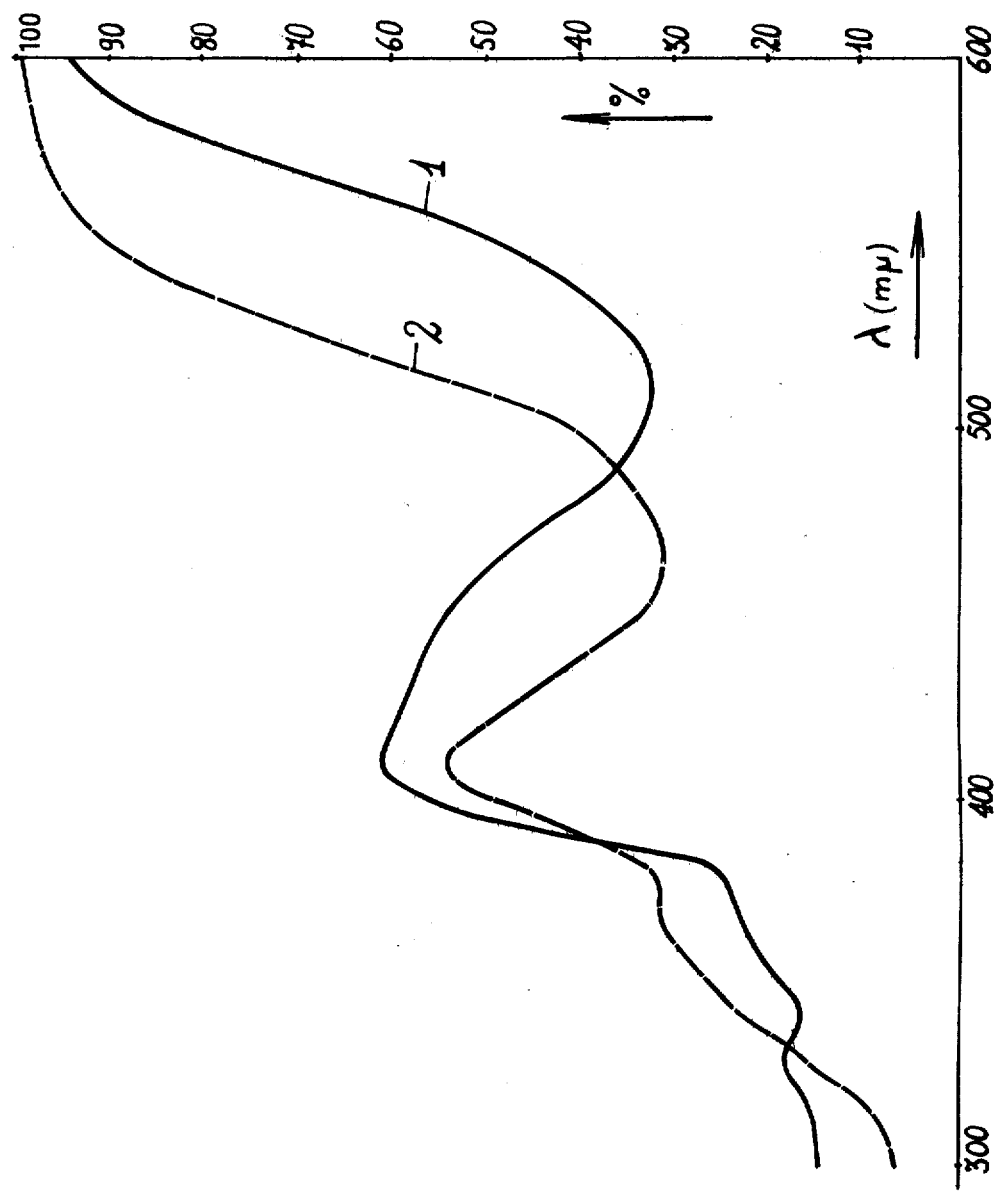

PROCESS FOR THE PREPARATION OF METHYLCOBALAMINE

This is a continuation-in-part of applicant's earlier application Ser. No. 303,147 filed Nov. 2, 1972 and now abandoned.

The invention relates to a process for the industrial preparation of methylcobalamine starting from cyanocobalamine or hydroxocobalamine.

Methylcobalamine is known and it is known that it is derived from cyanocobalamine by replacing the cyano (CN) group by a methyl ($CH_3$) group. Methylcobalamine, like cyanocobalamine and hydroxocobalamine is used in therapy for treatment in which the administration of vitamin $B_{12}$ is indicated.

Methylcobalamine, however, is more soluble in water than cyanocobalamine and hydroxocobalamine, and is therefore easier to process in the form of injectable ampoules.

There is also a known process for preparing methylcobalamine. In the known process, cyanocobalamine or hydroxocobalamine (vitamin $B_{12}$) is reduced to obtain reduced cobalamine ($B_{12s}$). The reduction is performed by using sodium boron hydride in an oxygen-free atmosphere, after which the reduced cobalamine ($B_{12s}$) is reacted with methyl oxalate or methyl iodide in order to bond the methyl group to the cobalt in the reduced cobalamine ($B_{12s}$).

The reduced cobalamine $B_{12s}$, however, has low stability and therefore tends, during the reduction reaction and more particularly before the methyl group is bonded, to become partly converted into cobalamine $B_{12r}$, which is a less-reduced cobalamine than cobalamine $B_{12s}$ and cannot bond a methyl group.

In order to avoid this serious drawback, which adversely affects the final yield of methylcobalamine, excess quantities of reducing agents have to be used. This leads to another difficulty, since there is a risk of irreversibly attacking the cobalamine molecule and forming degradation products which adversely affect the purity and the yield of methyl-cobalamine.

In order to prevent the conversion of cobalamine $B_{12r}$, it has been proposed to carry out the reaction in the presence of an inert gas such as argon. The use of argon, however, considerably complicates and increases the expense of the operations.

The process according to the invention is designed to obviate the disadvantages of the aforementioned process by converting cyanocobalamine or hydroxocobalamine to methylcobalamine under conditions which greatly reduce the risk of forming reduced cobalamines not capable of bonding a methyl group, or degradation products of cobalamine.

The invention relates to a process for preparing methylcobalamine, consisting of dissolving cyanocobalamine, or hydroxocobalamine in a solution of methanol and water, adding to said solution monomethyl oxalate and a cobalt salt and adding to the obtained solution zinc powder in order that simultaneous reduction and methylation occur.

The cyanocobalamine or hydroxocobalamine is simultaneously reduced and methylated by monomethyl oxalate, thus greatly limiting the life of the reduced cobalamine ($B_{12s}$) obtained by the action of the nascent hydrogen produced by the reaction between the monomethyloxalate and the metal powder, since the reduced cobalamine is methylated at the same rate as it is formed. The process can therefore be performed in the presence of air.

The reduction and methylation reactions when starting from cyanocobalamine can be representated by the following equation:

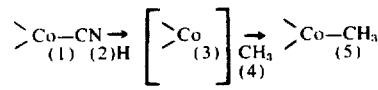

where (1) denotes cyanocobalamine, (2) denotes the nascent hydrogen produced by the action of the free acid group of monomethyl oxalate (also designed as methyl acid oxalate) on the metal powder, and (3) denotes the reduced cobalamine ($B_{12s}$) which is immediately methylated by the $CH_3$ group (4) coming from the methyl acid oxalate, to form methylcobalamine (5). Simultaneously with the aforementioned reactions, the CN group coming from cyanocobalamine (1) is hydrogenated to methylamine in accordance with the reaction:

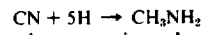

Theoretically, as the equation shows, only 5 gram-atoms of nascent hydrogen per gram-molecule of cyanocobalamine need to be liberated by reaction between monomethyl oxalate and the metal powder. It is preferable, however, to use an excess of monomethyl oxalate and metal powder.

The methylamine formed during reduction remains in the reaction medium and its methyl group in no way interferes with the methylation reaction. One would have expected, on the other hand, that the CN group liberated during the reduction reaction would interfere with the methylation reaction.

When starting from hydroxocobalamine, the hydroxy group OH liberated by reduction is converted into $H_2O$.

Zinc powder is preferably used, among metal powders capable of liberating hydrogen by their action on monomethyloxalate.

It is found that, in order to ensure that the reduction and methylation of cyanocobalamine occur under good conditions, the concentration of cyanocobalamine in the reaction medium must be greater than 40 g/l. This concentration is impossible to obtain in pure methanol or water, since the solubility of cyanocobalamine is only 20 g/l in methanol and 13 g/l in pure water. It has unexpectedly been found, however, that the solubility of cyanocobalamine increases in a mixture of methanol and water, reaching a maximum of 160 g/l when the proportion of water in the methanol is equal to 8 percent by volume.

It is unnecessary, however, to operate with the last-mentioned concentration of cyanocobalamine since favourable solubility, reduction and methylation conditions are obtained when the methanol and water mixture contains between 7 and 15 percent water.

In the case of hydroxocobalamine, which is more soluble than cyanocobalamine in water and in methanol favourable solubility, reduction and methylation conditions are obtained when the methanol and water mixture contains between 5 and 20 percent water.

In a preferred version of the method, the reaction medium is kept at a temperature between 28° and 32°C.

Preferably the reaction medium is kept within the aforementioned two temperature limits. If the temperature of the medium is above 32°C, the reduction tends to occur too quickly, so that there is a risk of degrading the cobalamine molecule. If, on the other hand, the temperature is less than 29°C, the reduction and methylation reactions are too slow and incomplete, thus adversely affecting the yield of the final product.

According to another feature of the method, cobalt salts are added to the reaction medium. The cobalt salts, which can be e.g. cobalt chloride, cobalt nitrate or cobalt oxalate, catalyse the reduction and, more particularly, regulate the pH of the reaction medium.

Under the aforementioned conditions, cyanocobalamine and hydroxocobalamine can be converted almost quantitatively into methylcobalamine. The development of the reaction can be followed, either visually or using a spectrophotometer. The cyanocobalamine or hydroxocobalamine solution is first red and then becomes violet, then chestnut-colored when the cyanocobalamine or the hydroxocobalamine has been converted to methylcobalamine.

The blue-green color reported in the literature and attributed to the formation of reduced cobalamine $B_{12s}$ does not appear, which proves that this compound has a very short life in the present process, since it is methylated as soon as it is formed.

As soon as the reaction is complete, the reaction medium is filtered in order to eliminate excess zinc and any insoluble zinc salts which are formed.

Next, the methylcobalamine in the filtrate is precipitated in 3 to 5 volumes of acetone and filtered, after which the methylcobalamine precipitate is redissolved in a mixture containing equal quantities of acetone and water.

The resulting solution can be left to crystallize directly, but is preferably first purified by introducing it at the top of suitable chromatographic columns.

In one variant of the process, the solution of cyanocobalamine or hydroxocobalamine, water, methanol and methyl oxalate are introduced into a column containing the metal powder and the methylcobalamine is separated from the solution collected at the column outlet.

Consequently, cyanocobalamine and hydroxocobalamine are continuously converted into methylcobalamine inside the column in contact with the metal powder, which liberated nascent hydrogen when reacting with monomethyloxalate.

The continuous operation increases the yield of methylcobalamine and, more particularly, enables a larger quantity of cyanocobalamine or hydroxocobalamine to be used during each operation.

After the reaction, the solution collected at the column outlet does not need to be filtered. The column, therefore, can immediately be used for separating and purifying the methyl cobalamine.

As in the first version of the process, the mixture of methanol and water used preferably contains between 7 and 15 percent of water, in the case of cyanocobalamine and between 5 and 25 percent of water in the case of hydroxocobalamine, and the cyanocobalamine or hydroxocobalamine solution is mixed with cobalt salts such as cobalt chloride, cobalt nitrate or cobalt oxalate.

We shall now give four non-limitative examples showing the process of preparing methylcobalamine from cyanocobalamine or hydroxocobalamine.

EXAMPLE 1

100 g of cyanocobalamine are dissolved in 2 liters of methanol and 200 cm³ of water. The solution is completely clear and has a characteristic red color.

200 g of monomethyl oxalate and 30 g of cobalt chloride are added to the solution and the resulting mixture is raised to 28°C and kept at the same temperature. 300 g of zinc powder is then added.

The reduction and methylation reactions start. Since these reactions are exothermic, the reaction medium is cooled and maintained at a temperature below 32°C. The reactions are left to continue for an hour, during which time the reaction medium is continuously agitated. At the end of the operation, the medium becomes chestnut-colored. The resulting mixture is filtered to eliminate zinc or zinc salts which have been formed and which are insoluble in the reaction medium. 3 to 5 volumes of acetone are added to the filtrate in order to precipitate the methylcobalamine. After filtering, the methylcobalamine precipitate which has been collected is re-dissolved in a mixture containing equal quantities of water and acetone.

The resulting solution is then introduced at the top of a column containing a resin comprising spherical polymer beads containing cation and anion exchange sites, e.g., the resin called "Retardion AG 11 AS" supplied by Bio-Rad and adapted to eliminate zinc, cobalt and other ions in solution. Next, the solution is introduced at the top of a column containing mixed beds comprising 3 volumes of a highly basic $[N(CH_3)^{3+}]$ anion-exchange resin such as IRA 400 resin manufactured by Rohm & Haas, per volume of cation-exchange acid sulphonic resin such as Amberlite IRC 120 manufactured by Rohm & Haas, for eliminating non-converted cyanocobalamine or excessively reduced cobalamines.

After purification, the solution is left to crystallize after acetone has been added.

The yield is 65 g of methylcobalamine.

The absorption spectrum of a dilute solution containing the resulting methylcobalamine has maxima at 267, 343 and 520 millimicrons, coinciding with those obtained for pure methylcobalamine.

A solution of demineralized water containing 5 micrograms per cm³ of methylcobalamine obtained as in the aforementioned example has a resistivity greater than 10,000 ohm/cm, showing that the methylcobalamine obtained does not contain any ions, e.g., derived from the zinc or cobalt introduced into the reaction medium.

As the example shows, the process for preparing methylcobalamine from cyanocobalamine is very easy to perform.

The methylcobalamine obtained is quite pure since the reduction of cyanocobalamine is controlled by means of a compound (methyl acid oxalate) which performs two functions, since it is both an acid capable of liberating nascent hydrogen by reaction with zinc powder and is an agent capable of methylating the reduced cobalamine.

The excellent yield of methylcobalamine is also due to the fact that the solution initially contains a considerable concentration of cyanocobalamine, which has been made possible owing to the judicious choice of a solvent comprising a mixture of methanol and water.

EXAMPLE 2

1 g of hydroxocobalamine is dissolved in 20 cc of methanol and 2 cc of water.

5 g of monomethyl oxalate were added to this solution. It is stirred until solution is complete and then 0.5 g of cobalt chloride and 4 g of fine zinc powder are added.

Stirring is continued for 1 hour and the solution is then filtered to eliminate the zinc or insoluble zinc salts from the reaction medium.

80 cc of acetone are added to precipitate the methylcobalamine and the precipitation is allowed to continue for 12 hours in the cold.

The product is filtered on a fritted glass filter, the collected precipitate is redissolved in 25 cc of water and 200 cc of acetone are then added. This solution is allowed to stand in the cold for 12 hours in order for crystallization to occur. The crystals collected after filtration are washed with acetone and then dried under vacuum at room temperature.

0.7 g of methylcobalamine are thus obtained which gives a pink solution in neutral or basic medium, and a yellow solution in acid medium.

The single FIGURE shows the spectrophotometric readings obtained, curve I being the absorption spectrum obtained in neutral or basic medium and curve II corresponding to the spectrum obtained in acid medium. The absorption maxima are indeed located at wave lengths of approximately 520, 343 and 267 millimicrons, for a neutral or basic solution of cobalamine.

It is possible to verify that the ratios of absorbances at 267 millimicrons and 525 millimicrons with respect to the absorbance at 343 millimicrons are respectively 1.43 and 0.63.

The absence of hydroxocobalamine in the methylcobalamine solution can further be checked by the absence of a buffered plateau between pH 4 and pH 9 which characterizes the hydroxocobalamine solution.

EXAMPLE 3

10 g of hydroxocobalamine are dissolved in 200 cc of methanol and 15 cc of water.

45 g of monomethyl oxalate are added to this solution which is stirred until dissolution is complete and 4 g of cobalt chloride and 35 g of fine zinc powder are then added.

Stirring is continued for 1 hour and the solution is filtered to eliminate the zinc or insoluble zinc salts from the reaction medium.

4 volumes of acetone are then added to the filtrate with stirring to precipitate the methylcobalamine and the precipitation is allowed to continue for 4 hours in the cold.

The product is filtered on a Buchner funnel and the collected precipitate is redissolved in the minimum quantity of water.

5N sodium hydroxide is then slowly added to this solution while following the pH, until a pH of 9.2 is reached so as to precipitate, as hydroxides, the zinc or cobalt which might have remained in solution.

It is then allowed to remain in the cold for two hours and filtered on a Buchner funnel.

2 liters of acetone are added to the filtrate and this solution is allowed to stand for 4 hours in the cold in order for crystallization to occur.

The crystals collected after filtration are washed with acetone and ether and then dried under vacuum at room temperature.

8.5 g of methylcobalamine are thus obtained containing 17 percent humidity.

The product obtained is controlled by measuring the resistivity of a demineralized water solution containing 5,000 gammas of methylcobalamine per cc.

The resistivity found is greater than 10,000 ohm/cm. This result shows that there are no more ions in solution which might be derived, in particular, from zinc or cobalt introduced into the reaction medium.

The above solution diluted to 50 gammas per cc of cobalamine shows spectrophotometric absorption maxima at 267, 343 and 520 millimicrons, corresponding to those obtained for pure methylcobalamine.

EXAMPLE 4

200 g of cyanocobalamine are dissolved in 4 liters of methanol and 400 cm$^3$ of distilled water. After dissolution is complete, 400 g of monomethyl oxalate and 100 g cobalt chloride are added and stirred until a clear solution is obtained.

A vertically disposed column having a height of 1 m and an inner diameter of 3 cm is filled with zinc powder to a height of 80 cm.

The column is washed and prepared, first by conveying a liter of methanol solution containing 10 percent by volume of water from the bottom to the top of the column. Next, the aforementioned cyanocobalamine solution is conveyed through the column from the bottom to the top, at a flow rate of approx. 1 liter per hour.

On leaving the column, the solution is collected in a vessel disposed in a place sheltered from light.

After all the prepared solution has been introduced into the column, the operation can be repeated, using a solution identical with the preceding solution.

Spectrophotoelectric analysis of the solution collected after travelling through the column show that 175 g of methylcobalamine have been obtained from 200 g of cyanocobalamine, i.e., the yield is 87.5 percent.

The following method is used to separate the methylcobalamine from the collected solution and to purify the methylcobalamine.

The solution is introduced into a column containing a resin called "Retardion AG 11 AS" supplied by Messrs. Bio-Rad, comprising polymer beads containing cation and anion-exchange sites and adapted to eliminate zinc, cobalt and other ions in solution.

Next, the solution is introduced into a column containing mixed beds comprising 3 volumes of a highly basic ion-exchange resin containing $N(CH_3)_3^+$ groups, e.g., IRA 400 resin manufactured by Rohm & Haas, per volume of cation-exchange acid sulphonic resin such as "Amberlite IRC 120" resin manufactured by Rohm & Haas, for eliminating non-converted cyanocobalamine or excessively reduced cobalamine.

After purification, the solution is left to crystallize after acetone has been added.

I claim:

1. In a process for the preparation of methylcobalamine from hydroxocobalamine, the improvement consisting essentially of dissolving hydroxocobalamine in a solution of methanol containing 5 to 20 percent of water by volume, adding to said solution monomethyloxalate and a cobalt salt selected from the group consisting of cobalt chloride, cobalt nitrate and cobalt oxalate and adding to the obtained solution zinc powder in order that simultaneous reduction and methylation of hydroxocobalamine occur.

2. A process as claimed in claim 1, and precipitating the methylcobalamine thus formed by addition of 3 to 5 volumes of acetone.

3. A process as claimed in claim 2, and collecting the methylcobalamine precipitate, redissolving said precipitate in a minimum quantity of water, adding a base until the pH is about 9, filtering the solution thus obtained, adding acetone to the filtrate, and then allowing the filtrate to stand for crystallization.

4. A process as claimed in claim 1, and keeping the reaction medium at a temperature between 28° and 32°C.

5. A process as claimed in claim 1, wherein the solution of cobalamine, water, methanol, monomethyloxalate and cobalt salt is introduced into a column filled with zinc powder in order that simultaneous reduction and methylation occur by contact between said solution and said zinc powder.

6. A process as claimed in claim 1, and separating by filtration the insoluble products.

7. In a process for the preparation of methylcobalamine from cyanocobalamine, the improvement consisting essentially of dissolving 40 to 160 grams per liter of cyanocobalamine in a solution of methanol containing 7 to 15 percent water by volume, adding to said solution monomethyloxalate and a cobalt salt selected from the group consisting of cobalt chloride, cobalt nitrate and cobalt oxalate, and adding to the obtained solution zinc powder in order that simultaneous reduction and methylation of hydroxocobalamine occur.

8. A process as claimed in claim 7, and precipitating the methylcobalamine thus formed by addition of 3 to 5 volumes of acetone.

9. A process as claimed in claim 8, and collecting the methylcobalamine precipitate, redissolving said precipitate in a minimum quantity of water, adding a base until the pH is 9, filtering the solution thus obtained, adding acetone to the filtrate, and then allowing the filtrate to stand for crystallization.

10. A process as claimed in claim 7, and keeping the reaction medium at a temperature between 28° and 32°C.

11. A process as claimed in claim 7, wherein the solution of cobalamine, water, methanol, monomethyloxalate and cobalt salt is introduced into a column filled with zinc powder in order that simultaneous reduction and methylation occur by contact between said solution and said zinc powder.

12. A process as claimed in claim 7, and separating by filtration and insoluble products.

* * * * *